United States Patent
Kwak et al.

(10) Patent No.: US 9,333,860 B2
(45) Date of Patent: May 10, 2016

(54) SYSTEM AND METHOD OF GUIDING EXECUTION OF MAIN FUNCTION OF VEHICLE

(71) Applicant: HYUNDAI MOTOR COMPANY, Seoul (KR)

(72) Inventors: Jong Duck Kwak, Gwacheon-Si (KR); Youngwoon Jo, Paju-Si (KR); Seung-Chang Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 16 days.

(21) Appl. No.: 14/453,332

(22) Filed: Aug. 6, 2014

(65) Prior Publication Data
US 2015/0165910 A1 Jun. 18, 2015

(30) Foreign Application Priority Data
Dec. 17, 2013 (KR) .......................... 10-2013-0157580

(51) Int. Cl.
*B60K 37/06* (2006.01)
(52) U.S. Cl.
CPC .......... *B60K 37/06* (2013.01); *B60K 2350/1016* (2013.01)
(58) Field of Classification Search
CPC .................. B60K 37/06; B60K 2350/1016
USPC ........................................................... 701/1
See application file for complete search history.

(56) References Cited

U.S. PATENT DOCUMENTS

| 2009/0178869 A1* | 7/2009 | Doll | B60K 31/00 180/170 |
| 2011/0258293 A1* | 10/2011 | Kim | G06F 9/02 709/219 |

FOREIGN PATENT DOCUMENTS

| KR | 10-2013-0041420 A | 4/2013 |
| KR | 10-1339833 B1 | 12/2013 |

* cited by examiner

*Primary Examiner* — Mussa A Shaawat
*Assistant Examiner* — Abdhesh Jha
(74) *Attorney, Agent, or Firm* — McDermott Will & Emery LLP

(57) ABSTRACT

A system for guiding execution of a main function of a vehicle, includes an input unit, a storage, a display and a controller. The input unit includes an independent function key configured to independently perform a function, and a dependent function key capable of performing a function when being selected in connection with another key. The storage stores vehicle state information indicating a state of the vehicle and explanation information about a dependent function key corresponding to error information. The display is configured to display guide information. The controller is configured to output, through the display, an input value of the dependent function key and explanation information corresponding to the vehicle state information by referring to the storage when the dependent function key is inputted two or more times while a condition for operating the dependent function key is not satisfied.

7 Claims, 2 Drawing Sheets

SYSTEM AND METHOD OF GUIDING EXECUTION OF MAIN FUNCTION OF VEHICLE

CROSS-REFERENCE TO RELATED APPLICATION

This application claims priority to and the benefit of Korean Patent Application No. 10-2013-0157580 filed in the Korean Intellectual Property Office on Dec. 17, 2013, the entire contents of which are incorporated herein by reference.

TECHNICAL FIELD

The present inventive concept relates to safe driving using a navigation device, and particularly, to a driving device and method based on a front image and a navigation device, which controls driving of a vehicle by using an image of a camera, and a gyro sensor and a navigation device.

BACKGROUND

Recently, various electronic devices are mounted in a vehicle for convenience of passengers inside the vehicle.

Further, various useful functions are set up in the vehicle, but frequently drivers are not accustomed to use a desired function.

Particularly, sometimes, even though a driver repeatedly selects a desired function, the driver is not accustomed to use the desired function, thereby failing to operate the desired function.

Accordingly, it is necessary for a vehicle manufacturer to improve the recognition that the vehicle manufacturer considers drivers and helps drivers to use a desired function of a vehicle, by analyzing and guiding a function intended by a driver so that the driver can properly or effectively use useful functions installed in the vehicle.

As a related art, Korean Patent Application Publication No. 2013-0041420 discloses a technology of displaying an icon of a function when a customer presses a button corresponding to the function inside a vehicle.

However, the related art does not disclose the provision of detailed explanation information about directions of using a specific function key when the specific function key is repeatedly pressed erroneously.

Further, Korean Patent Publication No. 10-1339833 B discloses a technology of providing a description of a function when a customer continuously presses a button of the function in a vehicle.

However, Korean Patent Publication No. 10-1339833 B does not disclose the provision of detailed explanation informing about directions of using a specific function key when the specific function key is repeatedly pressed erroneously.

The above information disclosed in this Background section is only for enhancement of understanding of the background of the inventive concept and therefore it may contain information that does not form the prior art.

SUMMARY

The present inventive concept has been made in an effort to provide a system and a method of guiding execution of a main function of a vehicle, which guide a driver so as for the driver to use an intended function by creating a database of error information about a dependent function key according to a model of a vehicle and storing the error information by a server, and providing a driver, who is not accustomed to use a dependent function key, with explanation information when a function key is erroneously operated.

Further, the present inventive concept has been made in an effort to provide more natural function execution convenience by reflecting an error frequently generated in an independent function key and a dependent function key actually executed by users in order to develop an improved component or a new vehicle/remodeled vehicle.

Furthermore, the present inventive concept has been made in an effort to improve recognition about a manufacturer of a vehicle as the vehicle manufacturer considering drivers by analyzing and guiding an intended function of a driver so as for the drivers to properly or effectively use useful functions mounted in a vehicle.

An exemplary embodiment of the present inventive concept provides a system for guiding execution of a main function of a vehicle, including:

an input unit including an independent function key independently performing a function, and a dependent function key capable of performing a function when being selected in connection with another key;

a storage storing vehicle state information indicating a state of the vehicle and explanation information about a dependent function key corresponding to error information;

a display configured to display guide information; and a controller configured to output an input value of the dependent function key and explanation information corresponding to the vehicle state information by referring to the storage when the dependent function key is input two or more times in a case where a condition for operating the dependent function key is not satisfied through the display or a voice output unit Another exemplary embodiment of the present inventive concept provides a system for guiding execution of a main function of a vehicle, including:

an input unit including an independent function key independently performing a function, and a dependent function key capable of performing a function when being selected in connection with another key;

a communication unit configured to communicate with an outside telematics multimedia system (TMS) server;

a vehicle state information storage storing vehicle state information indicating a state of the vehicle;

a voice output unit configured to output guide information describing a function of the vehicle by a voice;

a display configured to display the guide information; and a controller configured to transmit an input value of the dependent function key and the vehicle state information to the server through the communication unit when the dependent function key is input two or more times in a case where a condition for operating the dependent function key is not satisfied, receives explanation information corresponding to the input value of the dependent function key and the vehicle state information from the server, and outputs the received explanation information through the display or the voice output unit.

The vehicle state information may include information about at least one of a vehicle speed, whether an acceleration pedal is operated, whether a brake pedal is operated, and a vehicle identification number.

The controller may perform a corresponding function when the independent function key is selected.

The server may include a database storing explanation information about the dependent function key corresponding to error information in accordance with a model of the vehicle or the vehicle state by receiving the vehicle state information, such as a vehicle identification number, an input key value, a vehicle speed, a state of an acceleration pedal, and information about whether a brake is operated, and transmit the explanation information corresponding to the vehicle state information by referring to the database.

Another exemplary embodiment of the present inventive concept provides a method of guiding execution of a main function of a vehicle, including:

receiving a key input from a driver through an input unit including an independent function key independently performing a function, and a dependent function key capable of performing a function when being selected in connection with another key;

determining, by a controller, whether the independent function key is selected;

determining that the dependent function key is selected when the independent function key is not selected, and determining, by the controller, whether a condition for operating the dependent function key is satisfied;

performing, by the controller, a function corresponding to the dependent function key when the condition for operating the dependent function key is satisfied;

determining, by the controller, that an error is generated when the condition for operating the dependent function key is not satisfied, and storing current vehicle state information in a storage;

determining, by the controller, whether the error is repeated two or more times;

transmitting, by the controller, vehicle state information indicating a state of the vehicle to an outside TMS server when the error is repeated two or more times;

receiving, by the controller, explanation information corresponding to an input value of the dependent function key from the server; and receiving, by the controller, the explanation information and outputting the received explanation information through a display or a voice output unit.

The vehicle state information may include information about at least one of a vehicle identification number, an input key value, a vehicle speed, a state of an acceleration pedal, and whether a brake is operated.

The method may further include performing, by the controller, a function corresponding to the independent function key when the independent function key is selected.

The method may further include receiving, by the server, the vehicle state information and transmitting explanation information about the input value of the dependent function key to the controller.

According to the exemplary embodiments of the present inventive concept, the server may create a database of error information about the dependent function key according to a model of a vehicle and store the error information, and provide a driver, who is not accustomed to use the dependent function key, with explanation information when an operation error of the function key is generated, thereby guiding a driver to use an intended function.

Further, according to the exemplary embodiments of the present inventive concept, it is possible to provide more natural function execution convenience by reflecting an error frequently generated in the independent function key and the dependent function key actually executed by users in order to develop an improved component or a new vehicle/remodeled vehicle.

Furthermore, according to the exemplary embodiments of the present inventive concept, it is possible to improve recognition about a manufacturer of a vehicle as a vehicle manufacturer considering drivers by analyzing and guiding an intended function of a driver so as for the drivers to properly or effectively use useful functions mounted in a vehicle.

DETAILED DESCRIPTION OF THE EMBODIMENTS

Figure 1:
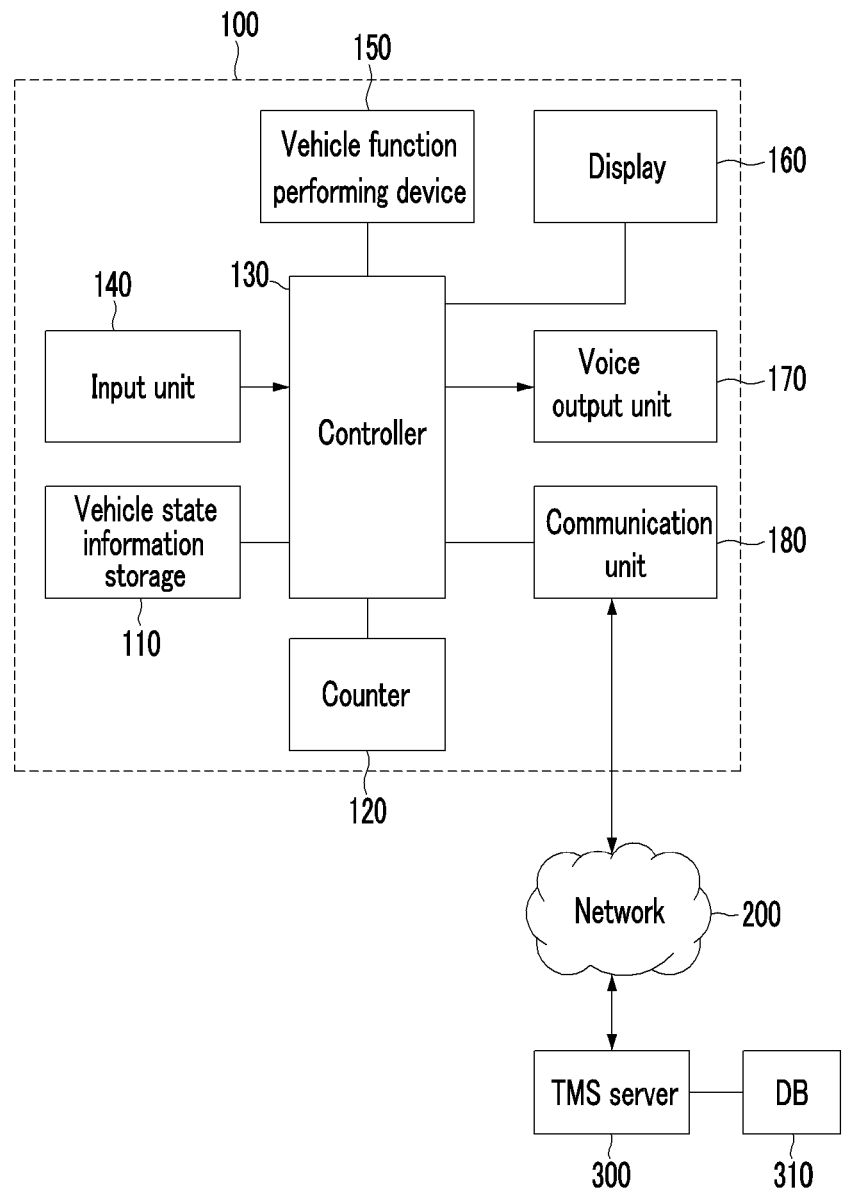
FIG. 1 is a diagram illustrating a system for guiding the execution of a main function of a vehicle according to an exemplary embodiment of the present inventive concept.

Hereinafter, exemplary embodiments of the present inventive concept will be described in detail with reference to the accompanying drawings.

As those skilled in the art would realize, the described embodiments may be modified in various different ways, all without departing from the spirit or scope of the present inventive concept.

In addition, each configuration illustrated in the drawings is arbitrarily shown for convenience of a description, but the present inventive concept is not limited thereto.

An independent function key means a key executing a requested function when the independent key is pressed, and a dependent function key means a key executing a requested function when a specific condition is satisfied. That is, the dependent function key is a key executing a corresponding function when another key is pressed at the same time or executing a corresponding function when is pressed after another key is pressed.

FIG. 1 is a diagram illustrating a system for guiding the execution of a main function of a vehicle according to an exemplary embodiment of the present inventive concept.

Referring to FIG. 1, a system 100 for guiding the execution of a main function of a vehicle according to an exemplary embodiment of the present inventive concept may include a vehicle state information storage 110, a counter 120, a controller 130, an input unit 140, a vehicle function performing device 150, a display 160, a voice output unit 170, and a communication unit 180.

The input unit 140 may include an independent function key independently performing a function, and a dependent function key capable of performing a function when being selected together with another key, or when being selected after another key is selected. The communication unit 180 may communicate with an outside telematics multimedia system (TMS) server 300 through a communication network 200. The vehicle function performing device 150 may perform a function of the vehicle. The vehicle state information storage 110 may store vehicle state information indicating a state of the vehicle. The counter 120 may perform counting. The voice output unit 170 may output guide information describing a function of the vehicle by a voice. The display 160 may display the guide information. The controller 130 may transmit an input value of the dependent function key and the vehicle state information to the server 300 through the communication unit 180 when the dependent function key is input two or more times in a state where a condition for operating the dependent function key is not satisfied by referring to the counter 120, receiving explanation information corresponding to the input value of the dependent function key and the vehicle state information from the server 300, and outputting the received explanation information to the display 160 or the voice output unit 170.

The vehicle state information may include information about at least one of a vehicle speed, whether an acceleration pedal is operated, whether a brake pedal is operated, and a vehicle identification number, and may also include an input key value as necessary.

The controller 130 may perform a function when the independent function key corresponding to the function is selected.

The server 300 may include a database (DB) 310 storing explanation information about the dependent function key corresponding to error information in accordance with a model of the vehicle or the vehicle state by receiving the vehicle state information, such as the vehicle identification number, an input key value, a vehicle speed, a state of the acceleration pedal, and the information about whether the brake is operated. The server 300 may transmit the explanation information corresponding to the vehicle state information by referring to the database 310.

The vehicle function performing device 150 may include various devices, such as a memory storing the vehicle identification number, a vehicle speed sensor, a throttle valve capable of recognizing a state of the acceleration pedal, and a device capable of recognizing whether the brake is operated, and operating switches.

An operation of the system for guiding the execution of the main function of the vehicle according to an exemplary embodiment including the aforementioned configuration will be described below.

Figure 2:
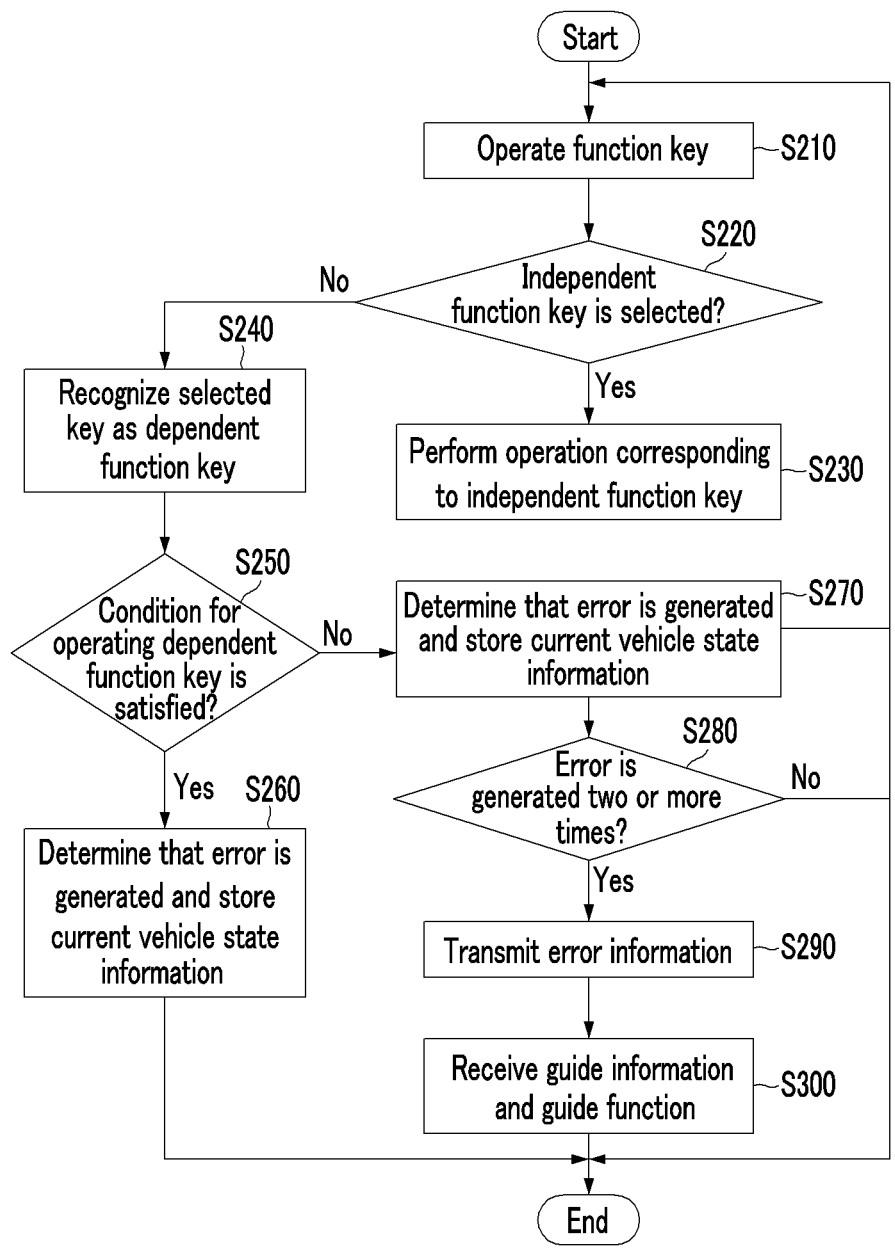
FIG. 2 is a flowchart illustrating a method of guiding the execution of a main function of a vehicle according to an exemplary embodiment of the present inventive concept.

FIG. 2 is a flowchart illustrating a method of guiding execution of a main function of a vehicle according to an exemplary embodiment of the present inventive concept.

Referring to FIG. 2, a driver may operate an independent function key or a dependent function key, such as various function operating switches or buttons, according to his/her necessity (S210). Here, the independent function key and the dependent function key correspond to function keys applied to the vehicle and stored in advance. The key capable of independently performing a function is defined as the independent function key, and the key capable of performing a function only when being selected together with another key is defined as the dependent function key.

Next, the controller 130 may determine whether the independent function key is selected (S220).

When the independent function key is selected, the controller 130 may perform an operation corresponding to the independent function key. For example, the controller 130 may perform an operation of the operating switch capable of independently performing the function, such as on/off operations of an air conditioner and on/off operations of music (S230).

In the meantime, when the selected function key is not the independent function key, the controller 130 may recognize that the selected function key is the dependent function key (S240), and determine whether a condition for operating the dependent function key is satisfied (S250).

When the condition for operating the dependent function key is satisfied, the controller 130 may control the vehicle function performing device 150 so as to perform a function corresponding to an input key value, and perform the corresponding function, such as on/off operations of the air conditioner or on/off operations of music (S260).

In the meantime, when the condition for operating the dependent function key is not satisfied, the controller 130 may determine whether the input key value has an error and store, if it is determined that the input key value has an error, information about a current vehicle state causing the error in the vehicle state storage 110 (S270).

Then, the controller 130 may determine whether the same error is repeated two or more times (S280). In this case, a time interval may be used by referring to an internal timer according to a necessity. For example, the controller 130 may determine whether the error is repeated two or more times within a predetermined interval, e.g., several seconds.

When the same error is repeated two or more times, the controller 130 may transmit, to the server 300, vehicle state information, such as a vehicle identification number, the input key value, a vehicle speed, a state of an acceleration pedal, and information about whether a brake is operated (S290).

In the meantime, the server may store the received vehicle state information values through which the current state may be recognized, such as the vehicle identification number, the input key value, the vehicle speed, the state of the acceleration pedal, the information about whether the brake is operated, and may create a database of explanation information about the dependent function key corresponding to error information based on the model of the vehicle or the vehicle state and store the explanation information, and transmit the explanation information most properly matched with the current vehicle state to the controller 130 by referring to the database 310.

Then, the controller 130 may receive, from the server, explanation information for preventing the error or explanation information corresponding to a proper execution guide, and output guide information through the display 160 or the voice output unit 170.

Accordingly, the driver may listen to the guide information, e.g., a description about his/her intended function, so that the driver can properly operate the dependent function key again without an error.

For example, it is assumed that in a vehicle in which a manual shift function mounted inside an automatic transmission is mounted, a driver needs to put a gear lever in a sport mode and then shift a gear by using a plus (+) key or a minus (−) key. In this case, an error may be generated when the driver repeatedly operates the dependent function key, such as the plus (+) key or the minus (−) key, in a state where the driver does not put the gear lever in the sport mode, or when the driver does not operate the plus (+) key or the minus (−) key in a state where the driver puts the gear lever in the sport mode. In this case, in an exemplary embodiment of the present inventive concept, the controller 130 may determine that the error is generated, transmit the current state information about the vehicle to the server, receive explanation information about directions of the sport mode from the server, and guide the driver by outputting the received explanation information to the driver.

Further, in an exemplary embodiment of the manual shift function mounted inside the automatic transmission, when it is determined that an ECO mode, not the sport mode, is appropriate, by analyzing a driving tendency/pattern of a customer, a function of recommending the ECO mode may be provided. In this case, a guide for an execution method of the ECO mode and a description of an effect of the ECO mode may be additionally provided.

For another example, in a case of a vehicle in which a cruise control function is mounted, a driver may need to select a dependent function key, such as a cruise function key, and then set a speed by using another dependent function key, such as a set/reset key and a plus (+) or minus (−) key. But, when the driver does not set a speed by using the set/reset key and the plus (+) or minus (−) key after pressing the cruise function key, an error may be generated. Also, when repetition of the release of the cruise function occurs due to the stepping of the acceleration pedal or the brake pedal even after the cruise function key is properly set, an error may be generated.

Even in this case, in an exemplary embodiment of the present inventive concept, the driver may receive the guide of setting information about the cruise function so as to properly operate the cruise function.

In the process, the guide information may be provided in connection with the TMS server, but the guide information corresponding to the error of the dependent function key may be stored in the storage and autonomously provided without connecting with the TMS server as necessary.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A system for guiding execution of a main function of a vehicle, comprising:
   an input unit including an independent function key configured to independently perform a function, and a dependent function key capable of performing a function when being selected in connection with another key;
   a storage storing vehicle state information indicating a state of the vehicle and explanation information about a dependent function key corresponding to error information;
   a display configured to display guide information; and
   a controller configured to output, through the display, an input value of the dependent function key and explanation information corresponding to the vehicle state information by referring to the storage when the dependent function key is inputted two or more times while a condition for operating the dependent function key is not satisfied,
   wherein the vehicle state information includes information about at least one of a vehicle speed, whether an acceleration pedal is operated, whether a brake pedal is operated, and a vehicle identification number, and
   wherein the controller having a function of recommending a mode responds to the vehicle state information.

2. The system of claim 1, further comprising:
   a voice output unit configured to output guide information describing a function of the vehicle,
   wherein the controller configured to output, through the voice output unit, the input value of the dependent function key and the explanation information corresponding to the vehicle state information by referring to the storage when the dependent function key is inputted two or more times while the condition for operating the dependent function key is not satisfied.

3. A system for guiding execution of a main function of a vehicle, comprising:
   an input unit including an independent function key configured to independently perform a function, and a dependent function key capable of performing a function when being selected in connection with another key;
   a communication unit configured to communicate with an outside telematics multimedia system (TMS) server;
   a vehicle state information storage storing vehicle state information indicating a state of the vehicle;
   a voice output unit configured to output guide information describing a function of the vehicle by a voice;
   a display configured to display the guide information; and
   a controller configured to transmit an input value of the dependent function key and the vehicle state information to the server through the communication unit when the dependent function key is inputted two or more times while a condition for operating the dependent function key is not satisfied, receive explanation information corresponding to the input value of the dependent function key and the vehicle state information from the server, and output the received explanation information through the display or the voice output unit,
   wherein the vehicle state information includes information about at least one of a vehicle speed, whether an acceleration pedal is operated, whether a brake pedal is operated, and a vehicle identification number, and
   wherein the controlled having a function of recommending a mode responds to the vehicle state information.

4. The system of claim 3, wherein:
   the controller is configured to perform a function to the independent function key when the independent function key is selected.

5. The system of claim 3, wherein:
   the server includes a database storing explanation information about the dependent function key corresponding to error information in accordance with a model of the vehicle or the vehicle state by receiving the vehicle state information that includes at least one of a vehicle identification number, an input key value, a vehicle speed, a state of an acceleration pedal, and information about whether a brake is operated, and
   the server is configured to transmit the explanation information corresponding to the vehicle state information by referring to the database.

6. A method of guiding execution of a main function of a vehicle, comprising:
   receiving a key input from a driver through an input unit that includes an independent function key that independently performs a function, and a dependent function key capable of performing a function when being selected in connection with another key;
   determining, by a controller, whether the independent function key is selected;
   determining, by the controller, that the dependent function key is selected when the independent function key is not selected, and determining whether a condition for operating the dependent function key is satisfied;
   performing, by the controller, a function corresponding to the dependent function key when it is determined that the condition for operating the dependent function key is satisfied;
   determining, by the controller, that an error is generated when it is determined that the condition for operating the dependent function key is not satisfied, and storing current vehicle state information in a storage;
   determining, by the controller, whether the error is repeated two or more times;
   transmitting, by the controller, vehicle state information indicating a state of the vehicle to an outside TMS server when it is determined that the error is repeated two or more times;
   receiving, by the controller, explanation information corresponding to an input value of the dependent function key from the server; and
   receiving, by the controller, the explanation information and outputting the received explanation information,
   wherein the vehicle state information includes information about at least one of a vehicle speed, whether an acceleration pedal is operated, whether a brake pedal is operated, and a vehicle identification number, and wherein the controller having a function of recommending a mode responds to the vehicle state information.

7. The method of claim 6, wherein:

the receiving, by the controller, of the explanation information and outputting of the received explanation information includes outputting, by the controller, the explanation information through a display or a voice output unit.

* * * * *